United States Patent
Weissman et al.

(10) Patent No.: US 8,366,821 B2
(45) Date of Patent: Feb. 5, 2013

(54) ADDITIVES FOR ALTERING THE HARDENING RATE OF CHEMICALLY BONDED SILICO-PHOSPHATE CEMENTS AND METHOD THEREFOR

(75) Inventors: Aharon Weissman, M.P. Misgav (IL); Yelena Gorelik, Kiryat Byalik (IL); Eyal Yehihel Vultz, Kfar Saba (IL); Dorit Perle, Haifa (IL); Basam Masri, Haifa (IL); Gideon Shikolsky, Kiryat Motzkin (IL); Ezrah Hanuka, Haifa (IL); Ron Frim, Haifa (IL); Eyal Ginzberg, Zikhron-Yaakov (IL)

(73) Assignee: IMI TAMI Institute for Research and Development Ltd., Haifa Bay (IL)

( * ) Notice: Subject to any disclaimer, the term of this patent is extended or adjusted under 35 U.S.C. 154(b) by 188 days.

(21) Appl. No.: 12/866,476

(22) PCT Filed: Feb. 5, 2009

(86) PCT No.: PCT/IL2009/000139
§ 371 (c)(1),
(2), (4) Date: Aug. 6, 2010

(87) PCT Pub. No.: WO2009/098692
PCT Pub. Date: Aug. 13, 2009

(65) Prior Publication Data
US 2010/0313792 A1 Dec. 16, 2010

Related U.S. Application Data

(60) Provisional application No. 61/026,490, filed on Feb. 6, 2008.

(51) Int. Cl.
*C04B 12/02* (2006.01)

(52) U.S. Cl. .......... 106/690; 106/691; 106/801
(58) Field of Classification Search .......... 106/690, 106/691, 801
See application file for complete search history.

(56) References Cited

U.S. PATENT DOCUMENTS
4,626,558 A  12/1986  Pellico

FOREIGN PATENT DOCUMENTS
GB  405508 A  2/1934
GB  593172 A  10/1947

OTHER PUBLICATIONS

Hall et al., The effect of retarders on the microstructure and mechanical properties of magnesia-phosphate cement mortar, Cement and Concrete Research, 2001, pp. 455-465, vol. 31.
International Search Report dated Jul. 2, 2009 in corresponding International Application No. PCT/IL2009/000139.

*Primary Examiner* — Paul Marcantoni
(74) *Attorney, Agent, or Firm* — The Law Office of Michael E. Kondoudis

(57) ABSTRACT

A method is provided for advantageously altering the rate of hardening of a magnesium silico-phosphate cement (MSPC). Addition of on the order of 1% of an $[MF_6]^{n-}$ salt or acid to an MSPC, obtained by adding the salt or acid either directly to the dry mix or to the water used to effect hydraulic hardening of the cement, significantly alters the hardening rate without adversely affecting the physical properties of the final set cement. In preferred embodiments, $Na_2TiF_6$ and/or $K_2TiF_6$ are used as retardants, while $K_3AlF_6$ is used as an accelerant. Other embodiments use $M'_n\text{-}MF_6$ compounds wherein M' is an alkali metal, an alkaline earth metal, or H, and M is chosen from inter alia Ti (n=2), Zr (n=2), Si (n=2), P (n=1), Al (n=3), and Sb (n=1).

32 Claims, 11 Drawing Sheets

ADDITIVES FOR ALTERING THE HARDENING RATE OF CHEMICALLY BONDED SILICO-PHOSPHATE CEMENTS AND METHOD THEREFOR

TECHNICAL FIELD

This invention relates to additives (also known as admixtures) for altering the rate of hardening of cements, particularly those additives that can decelerate or accelerate the rate of hardening of magnesium silico-phosphate cements (MSPC).

BACKGROUND ART

Because of their rapid hardening, high strength, and good binding to existing concrete, magnesium silico-phosphate cements, (MSPC) and in particular ammonium magnesium silico-phosphate (monoammonium phosphate, or MAP) cements (which comprise inter alia MgO and a soluble phosphate salt) are widely used as patching mortar for roads and airport runways. While rapid hardening can be a positive characteristic in situations such as road or runway repair where minimization of downtime is a goal, too rapid hardening can be a drawback as it limits the amount of time during which the cement can be worked before it sets. In order to control the hardening time, additives have been developed, primarily to lengthen the time before the cement sets. The most frequently used retardants for these cements are based on borate salts or boric acid, which can extend the time during which the cement is workable from about 10 minutes to about half an hour (see, e.g. U.S. Pat. No. 3,960,580 and U.S. Pat. No. 7,160,383). It should be mentioned here that the amount of retardant that can be added is limited to about 1-2% w/w, which extends the workability by only 10 minutes. Larger amounts of retardant can further extend the workability, but at the expense of significant deterioration in the compressive strength (CS) of the cement after it has set.

Other retardant systems have been proposed to overcome these difficulties. For example, U.S. Pat. No. 4,786,328 discloses the use of polycarboxylic acids (e.g. citric acid) or polyphosphonic acids (e.g. nitrilotris(methylene)tris(phosphonic acid). These compounds do not significantly extend the time before the cement sets, however. U.S. Pat. No. 6,783,799 discloses the use of fluorosilicates as retardants. In this case, however, the primary means by which the set time is extended is to delay for as long as possible the mixing of the acid and base fractions of the cement mix, presumably to reduce the rate of formation of the complex hydrated salt $MMgPO_4 \cdot 6H_2O$, where M is an alkali metal or $NH_4^+$. Due to the high exothermicity of the chemical reaction between the cement and added water (e.g. $\Delta H_{rxn} \sim -88$ kcal/mol for formation of $KMgPO_4 \cdot 6H_2O$), the addition of water leads to a rise in temperature, causing the process to undergo auto-acceleration. Simple fluoride salts have also been proposed as retardants for phosphate cements. For example, U.S. Pat. No. 6,458,423 teaches the use of a number of compounds including NaF and $CaF_2$ for use as retardants for phosphate cements. There is no evidence, however, that these retardants are any more effective than the borate salts currently considered most effective. Tomic, in U.S. Pat. No. 4,758,278, discloses the use of magnesium ferrate, prepared by heating magnesium oxide particles in the presence of ferric oxide, as a retardant. While this method did succeed in approximately doubling the set time of the resulting cement, it requires an additional preparative step, and even with the use of magnesium ferrate, set times were typically no longer than those obtained by the use of borate retardants.

There thus remains a long-felt need for a straightforward method by which the rate of hardening of these cements can be controlled more precisely than by the crude methods known in the prior art.

DISCLOSURE OF INVENTION

The present invention discloses a family of cement additives that (a) are readily available; (b) can significantly slow the rate of hardening of MSPCs in contexts in which less rapid hardening would be desirable; and (c) do not adversely affect the properties, particularly the compressive strength, of the hardened cement. The present invention discloses the use of a new family of retardants and accelerants based on commercially available salts and acids of complex fluoride anions of the general formula $[MF_6]^{n-}$.

It is an object of this invention to disclose a magnesium silico-phosphate cement (MSPC) comprising (a) a dry cement mix comprising (i) MgO, (ii) a phosphate salt or acid chosen from the group consisting of a phosphate salt or acid of the general formula $M_xH_yPO_4$ ($1 \leq x \leq 3$, $y=3-x$) where M is chosen from the group consisting of H, Li, Na, K, Rb, Cs, $NH_4$, and any combination of the above; any other phosphate salt or acid that will provide a binder product characterized by the empirical chemical formula $MMgPO_4 \cdot 6H_2O$; and any combination of the above; (iii) an aggregate phase chosen from the group containing $CaSiO_3$, $SiO_2$, fly ash, sea sand, and any combination thereof; and (iv) a fluorine-containing additive; and (b) sufficient water to effect hydraulic hardening of said cement. It is in the essence of the invention wherein said additive significantly alters the rate of hardening of said cement relative to the rate of hardening of and MSPC of identical composition except for the presence of said additive.

It is a further object of this invention to disclose an MSPC comprising (a) a dry cement mix comprising (i) MgO, (ii) a phosphate salt or acid chosen from the group consisting of a phosphate salt or acid of the general formula $M_xH_yPO_4$ ($1 \leq x \leq 3$, $y=3-x$) where M is chosen from the group consisting of H, Li, Na, K, Rb, Cs, and $NH_4$, or any combination of the above; any other phosphate salt or acid that will provide a binder product characterized by the empirical chemical formula $MMgPO_4 \cdot 6H_2O$; and any combination of the above; and (iii) an aggregate phase chosen from the group containing $CaSiO_3$, $SiO_2$, fly ash, sea sand, and any combination thereof; and (b) sufficient water to effect hydraulic hardening of said cement containing a fluorine-containing additive in a form chosen from the group consisting of (i) suspension, (ii) solution, (iii) any combination thereof. It is in the essence of the invention wherein said additive significantly alters the rate of hardening of said cement relative to the rate of hardening of an MSPC of identical composition except for the presence of said additive.

It is a further object of this invention to disclose an MSPC as defined in any of the above wherein the crystal structure of said binder product is especially isomorphic with $NH_4MgPO_4 \cdot 6H_2O$.

It is a further object of this invention to disclose an MSPC as defined in any of the above, wherein said additive is a retardant selected from the group consisting of (a) alkali metal salts of $[MF_6]^{n-}$, (b) alkaline earth metal salts of $[MF_6]^{n-}$, (c) $H_nMF_6$, and (d) any combination thereof; and further wherein M represents any element that can form with fluorine an anion of empirical formula $[MF_6]^{n-}$ and n represents a positive integer.

It is a further object of this invention to disclose an MSPC as defined in any of the above, wherein M is chosen from the group consisting of (a) Ti (n=2), (b) Zr (n=2), (c) Sb (n=1), and (d) any combination thereof.

It is a further object of this invention to disclose an MSPC as defined above, wherein said retardant is chosen from the group consisting of (a) $Na_2TiF_6$; (b) $K_2TiF_6$; and (c) any combination of the above.

It is a further object of this invention to disclose an MSPC as defined in any of the above, wherein said retardant is present in an amount of between about 0.05% and about 5% by weight based upon the weight of dry cement.

It is a further object of this invention to disclose an MSPC as defined in any of the above, wherein said additive is an accelerant selected from the group consisting of (a) alkali metal salts of $[MF_6]^{n-}$, (b) alkaline earth metal salts of $[MF_6]^{n-}$, (c) $H_nMF_6$, and (d) any combination thereof; and further wherein M is chosen from the group consisting of (a) Si (n=2), (b) Al (n=3), (c) P (n=1), and (d) any combination thereof.

It is a further object of this invention to disclose an MSPC as defined above, wherein said accelerant is $K_3AlF_6$.

It is a further object of this invention to disclose an MSPC as defined in any of the above, wherein said accelerant is present in an amount of between about 0.05% and about 5% by weight based upon the weight of dry cement.

It is a further object of this invention to disclose a method for advantageously altering the rate of hardening of an MSPC, comprising the steps of (a) obtaining a magnesium silico-phosphate cement mix comprising (1) MgO, (ii) a phosphate salt or acid chosen from the group consisting of a phosphate salt or acid of the general formula $M_xH_yPO_4$ ($1 \leq x \leq 3$, $y=3-x$) where M is chosen from the group consisting of H, Li, Na, K, Rb, Cs, $NH_4$, and any combination of the above; any other phosphate salt or acid that will provide a binder product characterized by the empirical chemical formula $MMgPO_4 \cdot 6H_2O$; and any combination of the above; and (iii) an aggregate phase chosen from the group containing $CaSiO_3$, $SiO_2$, fly ash, sea sand, and any combination thereof; (b) admixing a fluorine-containing additive into said cement mix, thereby altering the rate of hardening of said MSPC; and (c) adding sufficient water to effect hydraulic setting of said cement. It is within the essence of the invention wherein said step of admixing said additive significantly alters the rate of hardening of said MSPC relative to the rate of hardening of an MSPC produced by a method lacking said step of admixing said additive.

It is a further object of this invention to disclose a method for advantageously altering the rate of hardening of an MSPC, comprising the steps of (a) obtaining a magnesium silico-phosphate cement mix comprising (i) MgO, (ii) a phosphate salt or acid chosen from the group consisting of a phosphate salt or acid of the general formula $M_xH_yPO_4$ ($1 \leq x \leq 3$, $y=3-x$) where M is chosen from the group consisting of H, Li, Na, K, Rb, Cs, $NH_4$ and any combination of the above; any other phosphate salt that will provide a binder product characterized by the empirical chemical formula $MMgPO_4 \cdot 6H_2O$; and any combination of the above; and (iii) an aggregate phase chosen from the group containing $CaSiO_3$, $SiO_2$, fly ash, sea sand, and any combination thereof; (b) obtaining a volume of water sufficient to effect hydraulic setting of said cement, said water containing a fluorine-containing additive in the form chosen from the group consisting of (i) solution, (ii) suspension, (iii) any combination thereof; and (c) admixing said cement mix and said suspension and/or solution, thereby altering the rate of hardening of said MSPC. It is within the essence of the invention wherein said step of admixing said additive significantly alters the rate of hardening of said cement relative to the rate of hardening of an MSPC produced by a method lacking said step of admixing said additive.

It is a further object of this invention to disclose a method as defined in any of the above for advantageously altering the rate of hardening of an MSPC as defined above, wherein said binder product is especially isomorphic with $NH_4MgPO_4 \cdot 6H_2O$.

It is a further object of this invention to disclose a method for advantageously altering the rate of hardening of an MSPC as defined above, wherein said fluorine-containing additive is a retardant selected from the group consisting of (a) alkali metal salts of $[MF_6]^{n-}$, (b) alkaline earth metal salts of $[MF_6]^{n-}$, (c) $H_nMF_6$, and (d) any combination thereof; and further wherein M represents any element that can form with fluorine an anion of empirical formula $[MF_6]^{n-}$ where n is an integer.

It is a further object of this invention to disclose such a method, wherein M is chosen from the group consisting of (a) Ti (n=2), (b) Zr (n=2), (c) Sb (n=1), and (d) any combination thereof.

It is a further object of this invention to disclose such a method, wherein said retardant is chosen from the group consisting of (a) $Na_2TiF_6$; (b) $K_2TiF_6$; and (c) any combination of the above.

It is a further object of this invention to disclose a method for advantageously altering the rate of hardening of an MSPC as defined above, wherein said retardant is present in an amount of between about 0.05% and about 5% by weight based upon the weight of dry cement.

It is a further object of this invention to disclose a method for advantageously altering the rate of hardening of an MSPC as defined above, wherein said fluorine-containing additive is an accelerant selected from the group consisting of (a) alkali metal salts of $[MF_6]^{n-}$, (b) alkaline earth metal salts of $[MF_6]^{n-}$, (c) $H_nMF_6$, and (d) any combination thereof; and further wherein M represents any element that can form with fluorine an anion of empirical formula $[MF_6]^{n-}$ where n is a positive integer.

It is a further object of this invention to disclose such a method, wherein M is chosen from the group consisting of (a) Si (n=2), (b) Al (n=3), (c) P (n=1), and (d) any combination thereof.

It is a further object of this invention to disclose such a method, wherein said accelerant is $K_3AlF_6$.

It is a further object of this invention to disclose a method for advantageously altering the rate of hardening of an MSPC as defined above, wherein said accelerant is present in an amount of between about 0.05% and about 5% by weight based upon the weight of dry cement.

MODES FOR CARRYING OUT INVENTION

Figure 1A:
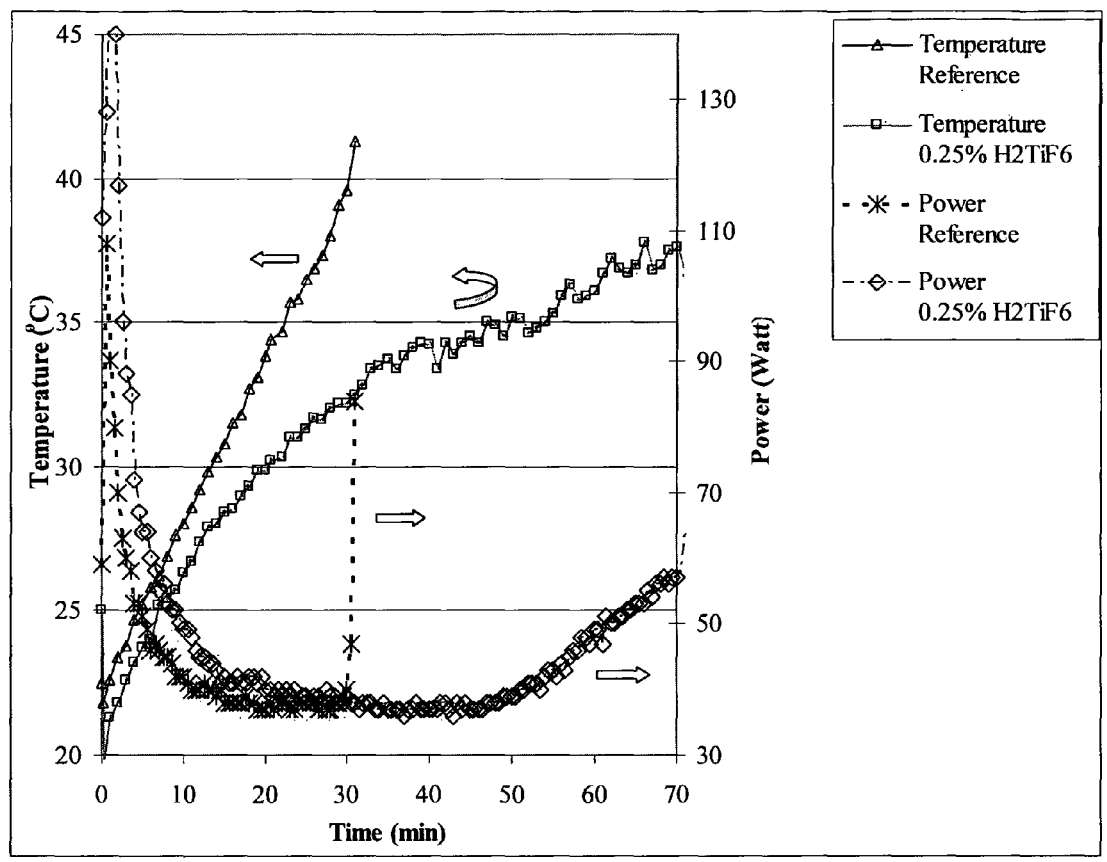
FIG. 1 shows a series of graphs illustrating the effects of added $H_2TiF_6$ on the rate of temperature increase, the mixing power, and the Vicat penetration force of Nova-Set cement as a function of $H_2TiF_6$ concentration and of time.

Other objects and the further scope of the applicability of the present invention will be apparent to one skilled in the art from the detailed description given hereinafter. It should be understood, however, that the detailed description and specific examples, while indicating preferred embodiments of the invention, are given by way of illustration only, since various changes and modifications within the spirit and scope of the invention will become apparent to one skilled in the art from this detailed description. The invention is therefore not limited by that which is illustrated in the figures and described in the specification, but only as indicated in the accompanying claims, with the proper scope determined only by the broadest interpretation of said claims.

We adopt the following definitions in the detailed description that follows:

"Retardant" refers to an additive that is added to a cement or cement mixture that has the effect of slowing down the rate at which the cement or cement mixture hardens relative the rate of hardening of a cement or cement mixture that is identical in every way except for the presence of the additive;

"Accelerant" refers to an additive that is added to a cement or cement mixture that has the effect of speeding up the rate at which the cement or cement mixture hardens relative the rate of hardening of a cement or cement mixture that is identical in every way except for the presence of the additive.

"Binder" refers to a compound formed during the interaction between the dry cement mix and water that imparts a high compressive strength to the cement.

"Setting" refers to the hardening of the cement.

"Reference cement" refers to a basic cement formulation that does not contain any additives. With reference to quantities, the term "about" refers to an amount within ±20% of the stated quantity.

The basic formulation for the cement mixture described hereinafter is a dry mixture of powdered MgO, powdered $KH_2PO_4$, and an aggregate phase chosen from $CaSiO_3$ (wollastonite), fly ash, and sea sand, in an ratio of approximately 10:35:55 by weight. This formulation will hereinafter be referred to as "Nova-Set." In the best embodiment of the invention, dead burned MgO is used, and a predetermined amount of a fluorine-containing additive is added to the Nova-Set mix. Water is then added in sufficient quantity (at least stoichiometric) to enable hydraulic hardening of the cement. The wet mixture is then blended for at least 15 minutes and then cast. In some of the examples detailed below, a portion of the mixture was blended until it became too viscous for further blending. In other embodiments of the invention, instead of adding the additive to the dry Nova-Set mix, an aqueous solution or suspension of the additive is prepared in sufficient water to enable hydraulic hardening of the cement. The dry Nova-Set mix is then added to this aqueous solution or suspension and the cement prepared as above.

The additives disclosed in the present invention are all compounds that contain anions of the general formula $[MF_6]^{n-}$. As discussed in detail below, when M=Ti or Zr (n=2), the additive is a retardant. For these additives, the counterion is chosen from the group containing $H^+$, alkali metal cations, and alkaline earth cations. In the best mode of operation of the invention, M=Ti, the counterion is $H^+$, $Na^+$ or $K^+$, and the additive is present in the cement in an amount of between about 0.05% and about 5% by weight based on the weight of dry cement. A typical embodiment contains about 1% by weight of additive based on the dry weight of the final product. We note that when the counterion is $H^+$, the additive ($H_2MF_6$) reacts with the MgO present in the Nova-Set mix to form the highly soluble salt $MgMF_6$ (and $H_2O$); thus, addition of $H_2MF_6$ is essentially equivalent to adding $MgMF_6$.

On the other hand, as discussed in detail below, when M=Si (n=2), Al (n=3), or P (n=1), the additive is an accelerant. For these cases as well, the counterion is chosen from the group consisting of $H^+$, alkali metal cations, and alkaline earth cations. In the best mode of operation of the invention, M=Al, the counterion is $K^+$, and the accelerant is present in the cement in an amount of between about 0.05% and 5% by weight based on the weight of dry cement. A typical embodiment contains about 1% by weight of additive based on dry weight of the final product.

As non-limiting examples of the properties of the additives herein disclosed, graphs comparing the properties of Nova-Set additionally containing these additives with properties of Nova-Set containing no additives are now presented. For these examples, the powder mixture was made by using a Kenwood model KM415 blender with a three-phase energy analyzer. The temperature during blending was measured by an Elcontrol Microvip 3 OPTCTLT20 temperature analyzer. An EINet—Gewiss GW44208 IP56 was used for power measurements. Vicat penetration force measurements were made according to ASTM standard C 403/C 403M—06 by using a Humboldt/Gilson model MH 570 with a sample height of 40 mm and a sample diameter of 90 mm. CS measurements were made by using an INSTRON 550R load cell 10t. Densities of the casts were calculated from the measured weights and volumes, where the volumes were calculated from the measured radii and heights of the cylindrical casts.

Figure 1B:
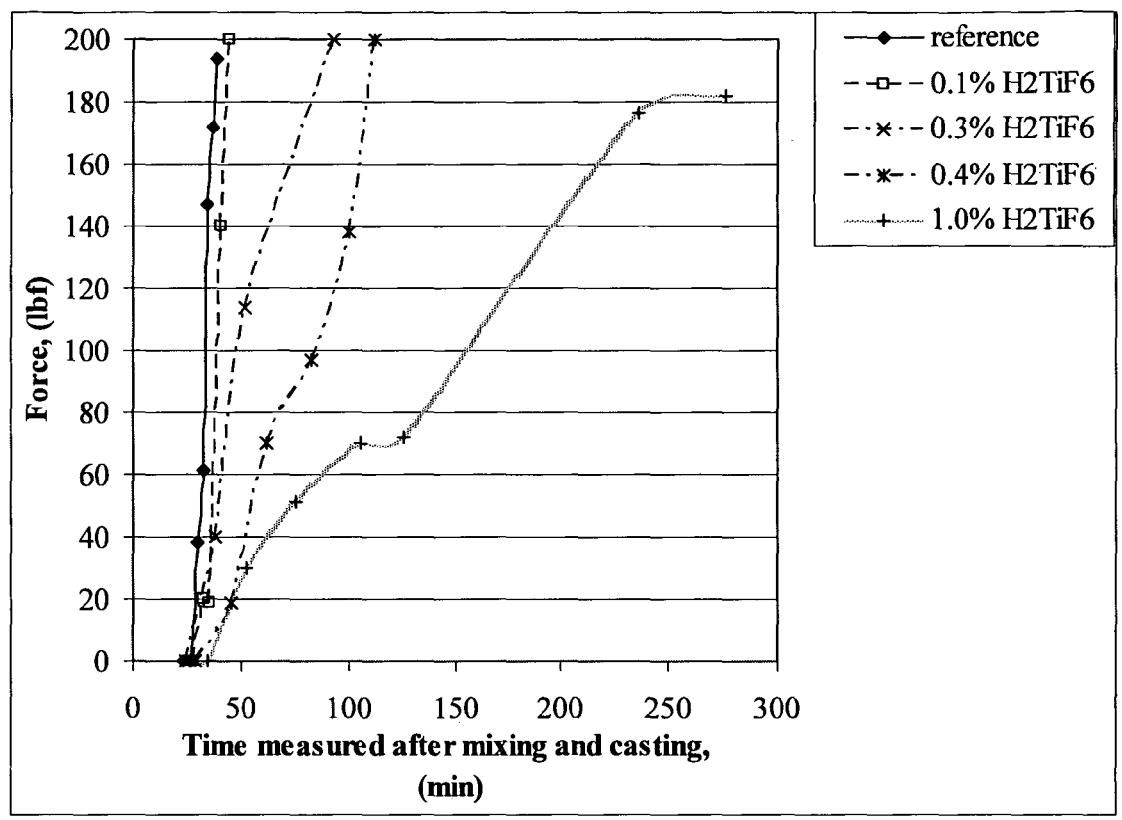
Figure 2A:
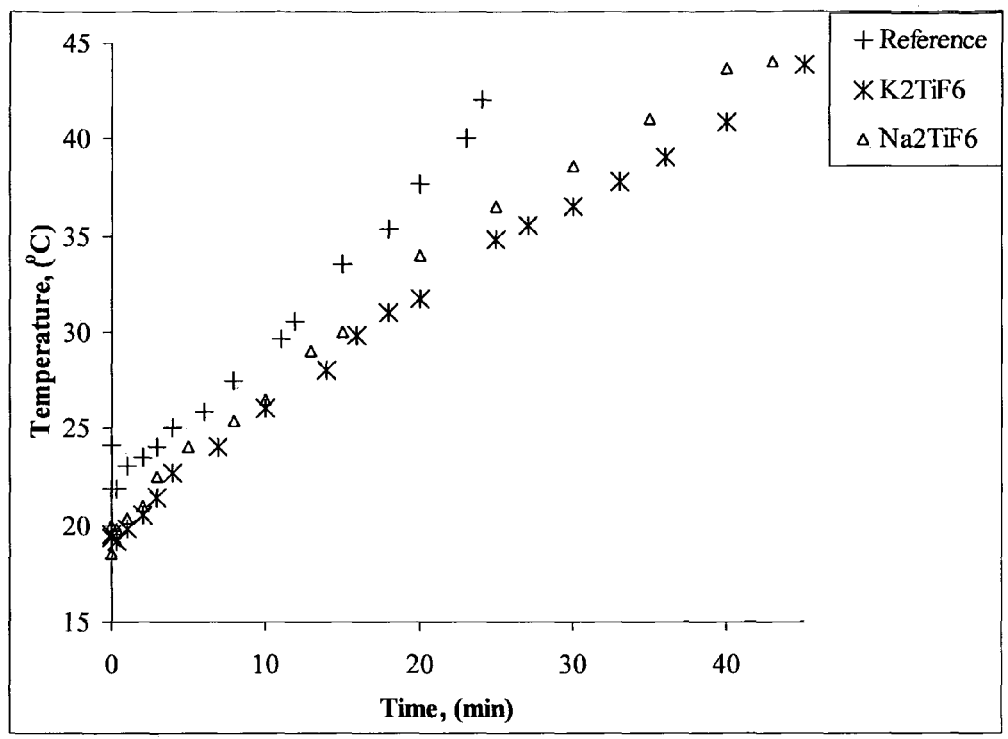
FIG. 2 shows graphs illustrating the effects of various fluorine-containing additives on the temperature of the paste as a function of time after the start of mixing.
Figure 2B:
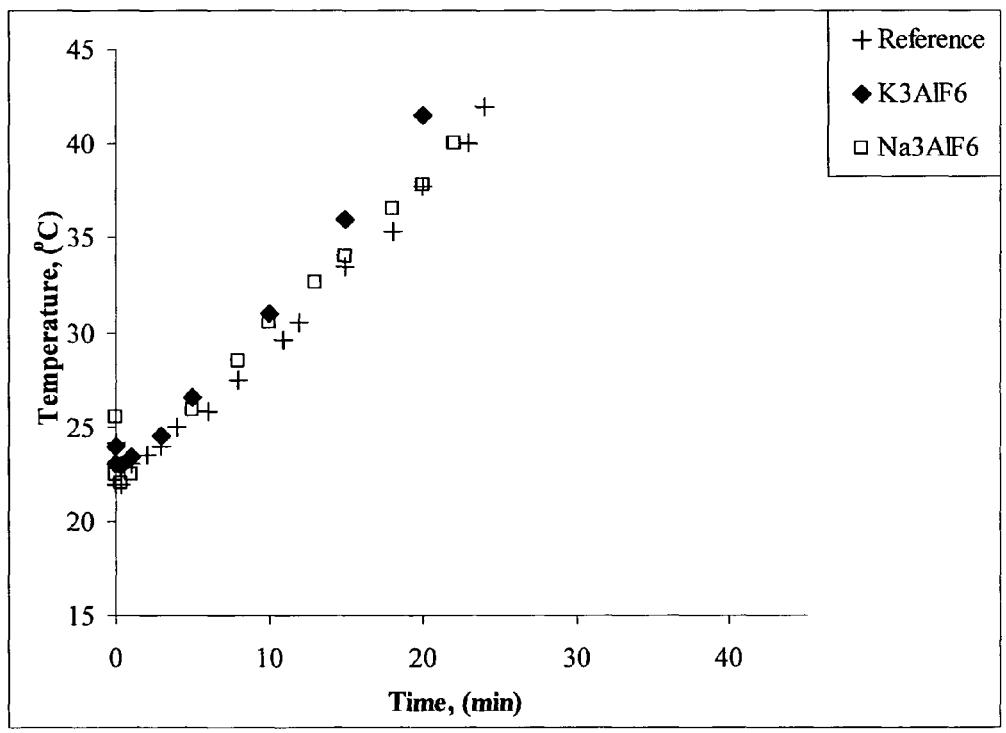

Reference is now made to FIG. 1, which shows effects of on various physical parameters of the cement when $H_2TiF_6$ is used as an additive. FIG. 1a shows the temperature of the paste and the mixing power as a function of time following the commencement of mixing. In this figure, a mix containing 0.25% $H_2TiF_6$ additive is compared with a reference sample prepared without the addition of any additive whatsoever. The temperature measurements (left-hand y-axis) demonstrate that $H_2TiF_6$ acts as a retardant, with the temperature rise during mixing delayed by over half an hour. A similar effect is seen in the mixing power (right-hand y-axis), in which a similar delay is seen in the case where the cement includes the $H_2TiF_6$ additive. FIG. 1b shows Vicat compressive force measurements made as a function of time after casting following a 15-minute mixing period for a series of experiments with different amounts of additive. The results clearly show that $H_2TiF_6$ acts as a retardant at all concentrations used, and, more importantly, that while 1% retardant reduces the final compressive strength, ~0.4% retardant actually improves the final compressive strength. Reference is now made to FIG. 2, which shows the temperature of the cement as a function of time following the start of mixing. FIG. 2a shows results for cement containing a retardant (1% w/w $K_2TiF_6$ or $Na_2TiF_6$) relative to a reference cement not containing additive. As can clearly be seen in the figure, the rate of temperature rise due is significantly slower when the additive is present, indicating that the exothermic reaction is proceeding much more slowly in these cases (i.e. the setting rate has been significantly slowed). FIG. 2b shows results for cement containing 1% w/w $K_3AlF_6$ or $Na_3AlF_6$ relative to a reference cement not containing additive. Again, the effect of the additive can clearly be seen; in this case, however, the temperature rise is faster when the additive is present, indicating that the $[AlF_6]^{3-}$ salts accelerate the exothermic hardening of the cement, with $K_3AlF_6$ the more effective accelerant of the two. The specific accelerant/retardant effect depends both on M and on the counterion. Thus, for example, an additive containing M=Zr and $K^+$ as the counterion acts as a retardant, while an additive containing M=P and $Na^+$ as the counterion acts as an accelerant. The different degrees to which different ions affect the hardening rate can be utilized in additional embodiments in which the rate of hardening is set by the operator by the use of an appropriate mixture of salts with different properties.

Figure 3A:
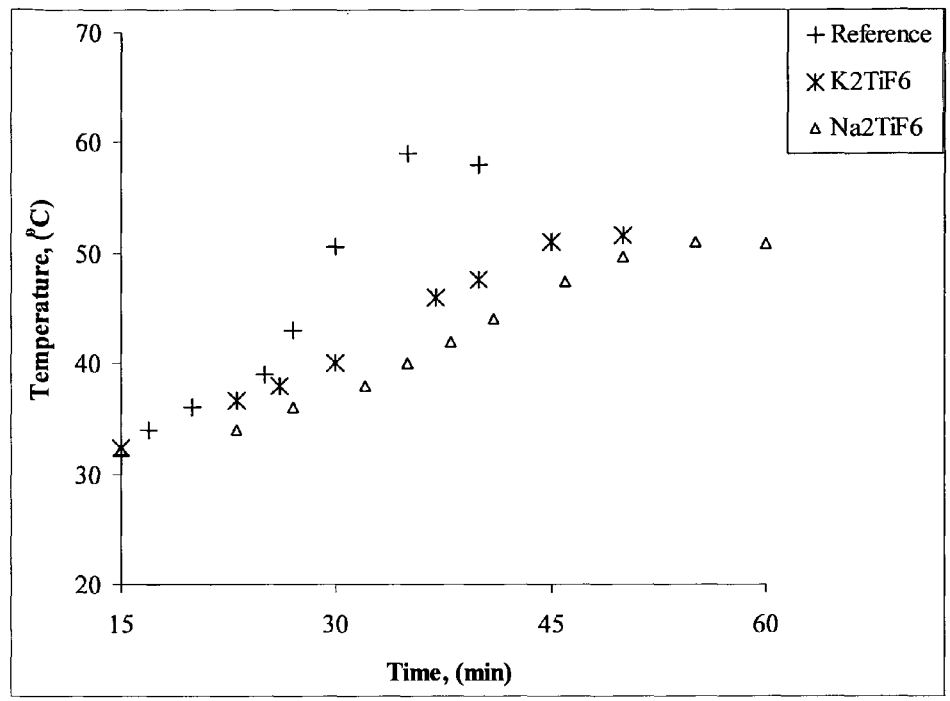
FIG. 3 shows graphs illustrating the effects of various fluorine-containing additives on the temperature of the cast cement as measured after a 15 minute paste mixing period.
Figure 3B:
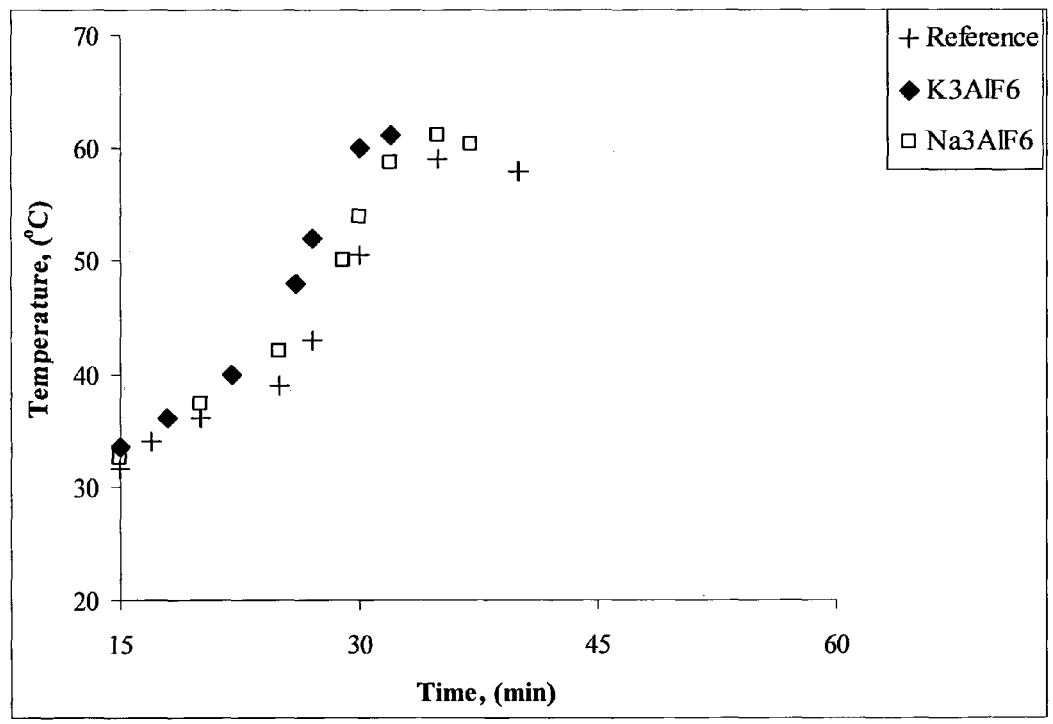

Reference is now made to FIG. 3, which shows results for measurements of the temperature of the cast made following 15 minutes of mixing (in contrast to the temperature measurements illustrated in FIG. 2, which were made during the mixing of the cement). FIG. 3a compares results for Nova-Set containing a retardant (1% w/w of either $K_2TiF_6$ or $Na_2TiF_6$) with cement containing no additive, and FIG. 3b compares results for Nova-Set to which an accelerant (1% w/w of either $K_3AlF_6$ or $Na_3AlF_6$) was added to those for cement containing no additive. As can be seen in these figures, the retardant or accelerant effect extends far beyond the mixing time; in the case of 1% $M_2TiF_6$, the retardant effect lasts for at least an hour after the start of mixing.

Figure 4A:
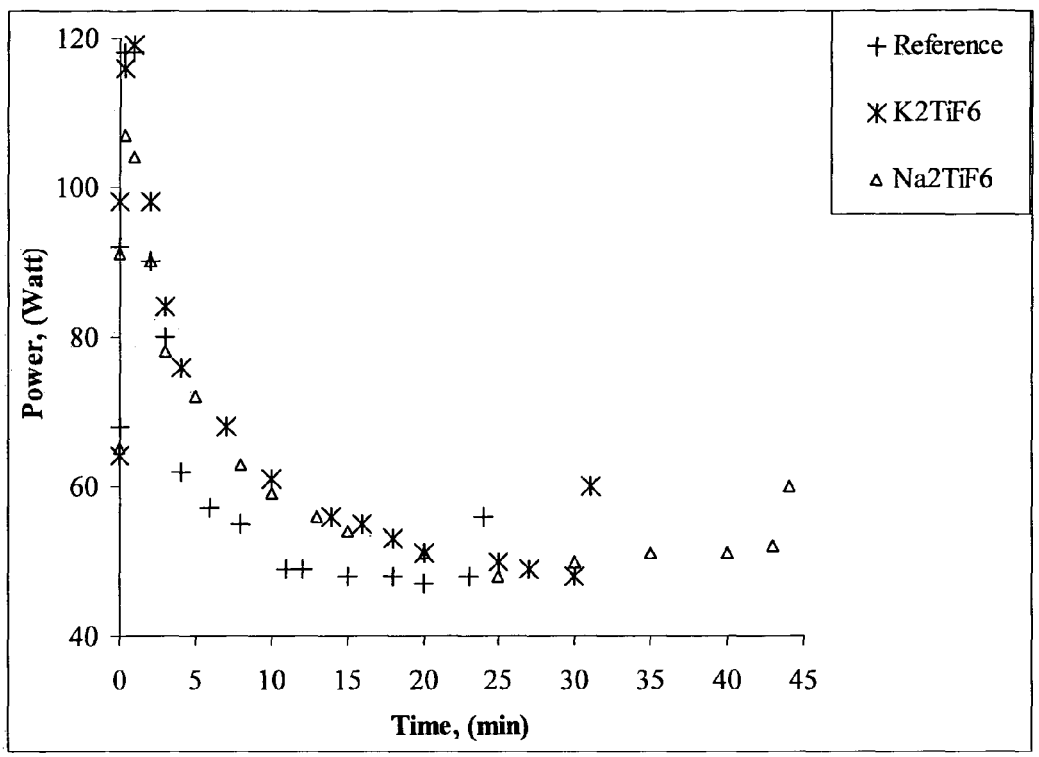
FIG. 4 shows graphs illustrating the effects of various fluorine-containing additives on the mixing power as a function of time during paste mixing.
Figure 4B:
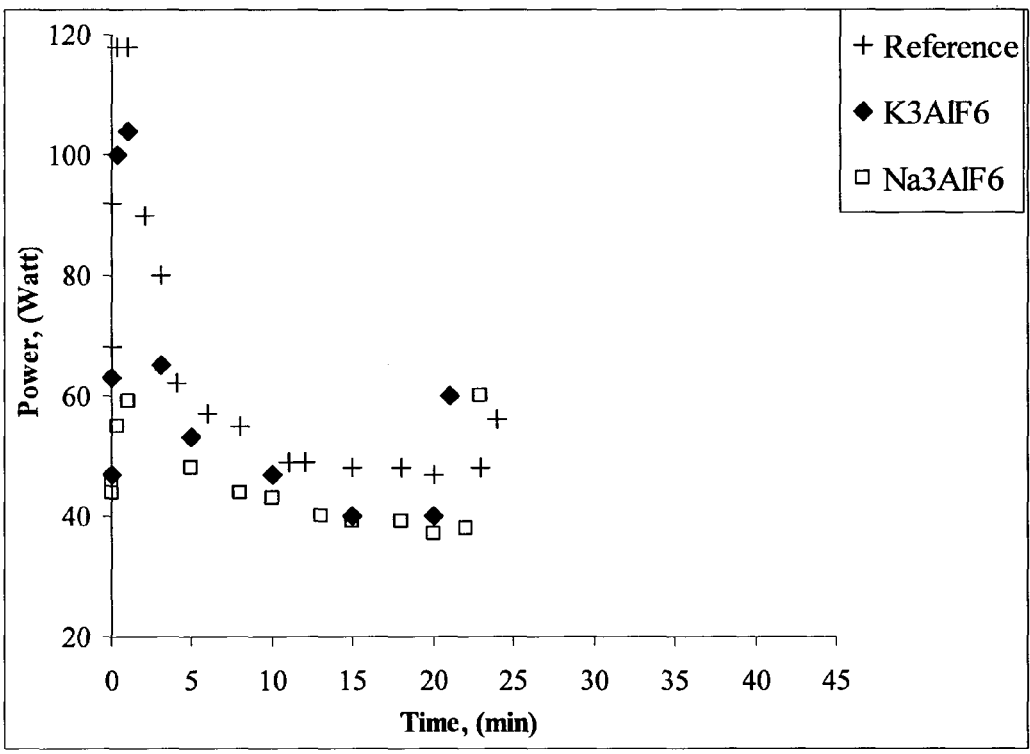

Reference is now made to FIG. 4, which shows the power used by the Kenwood mixer during mixing as a function of time for cement compositions with and without additives. FIG. 4a compares results for cement containing a retardant (1% w/w $K_2TiF_6$ or $Na_2TiF_6$) to those for cement containing no additive. The slower decline in mixing power and longer time to reach the sudden increase in mixing power for the cements containing the retardant further demonstrates the effectiveness of $[TiF_6]^{2-}$ as a retardant. Note that the final value reached is independent of whether or not the cement contains the retardant, further evidence that while the additive affects the set time, it does not significantly affect the properties of the cement after setting. FIG. 4b shows results for cement compositions containing accelerants (1% w/w $K_3AlF_6$ or $Na_3AlF_6$) relative to a reference sample without any additive. In these cases, the mixing power declines more rapidly as a function of time for compositions containing accelerant, the opposite effect seen when a retardant is added, and consistent with the previous results. Once again, it can be seen that the specific accelerant/retardant properties of the additive depend on M and on the counterion.

Figure 5:
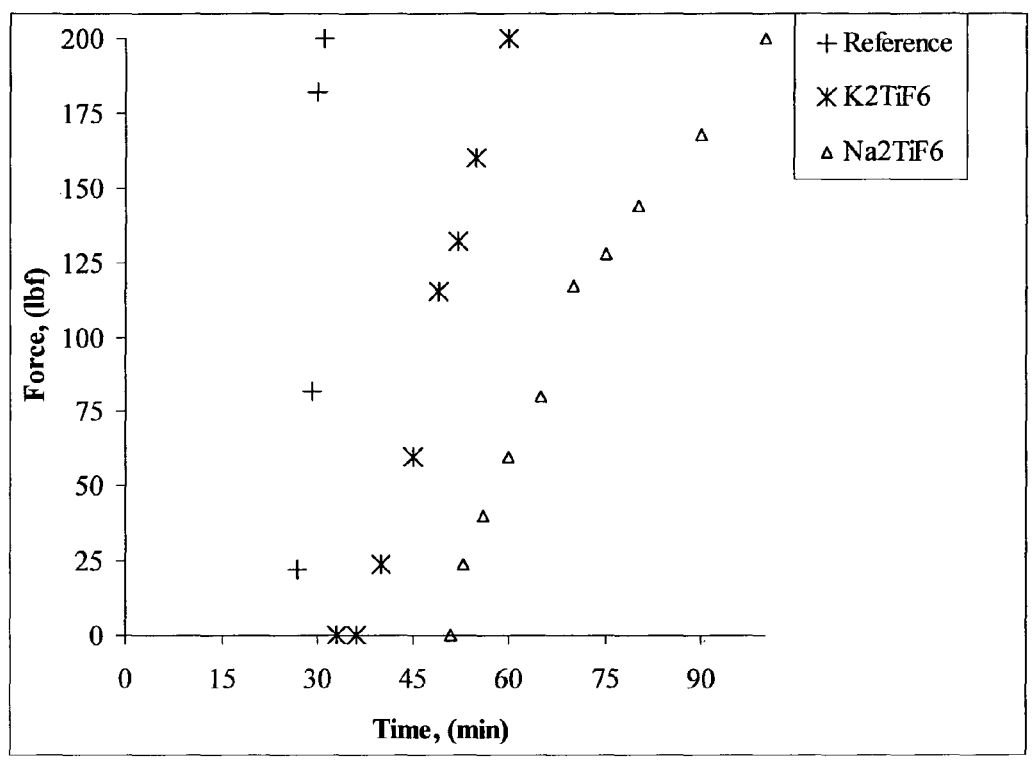
FIG. 5 shows a graph illustrating the effects of $[TiF_6]^{2-}$ additives on the Vicat force as a function of time after the maximum mixing and further casting.

Reference is now made to FIG. 5, showing results of Vicat force penetration tests for Nova-Set containing 1% w/w $M_2TiF_6$ (M=K, Na) as a function of time following the time after which the viscosity became too high for further mixing. For a cement composition not containing any additive, the force reaches 200 lbf in less than 30 min. For M=K, 200 lbf is not reached until approximately 50 min, while for M=Na, it has not been reached even after 90 min. These results clearly show that not only is the rate of reaction slower for cement containing the additive (as shown in FIGS. 2 and 3), but that the additive is slowing down the time it takes to reach a given level of hardness. Moreover, it is clear from FIG. 5 that even when the additive is present, the cement does eventually reach the same hardness that an equivalent cement lacking the additive does. Due to the extended mixing time in these experiments, by the time that most of the pastes reached the hardening stage, the Vicat penetration force was already >100 lbf, so the Vicat penetration force measurements could not be made in all cases.

Figure 6A:
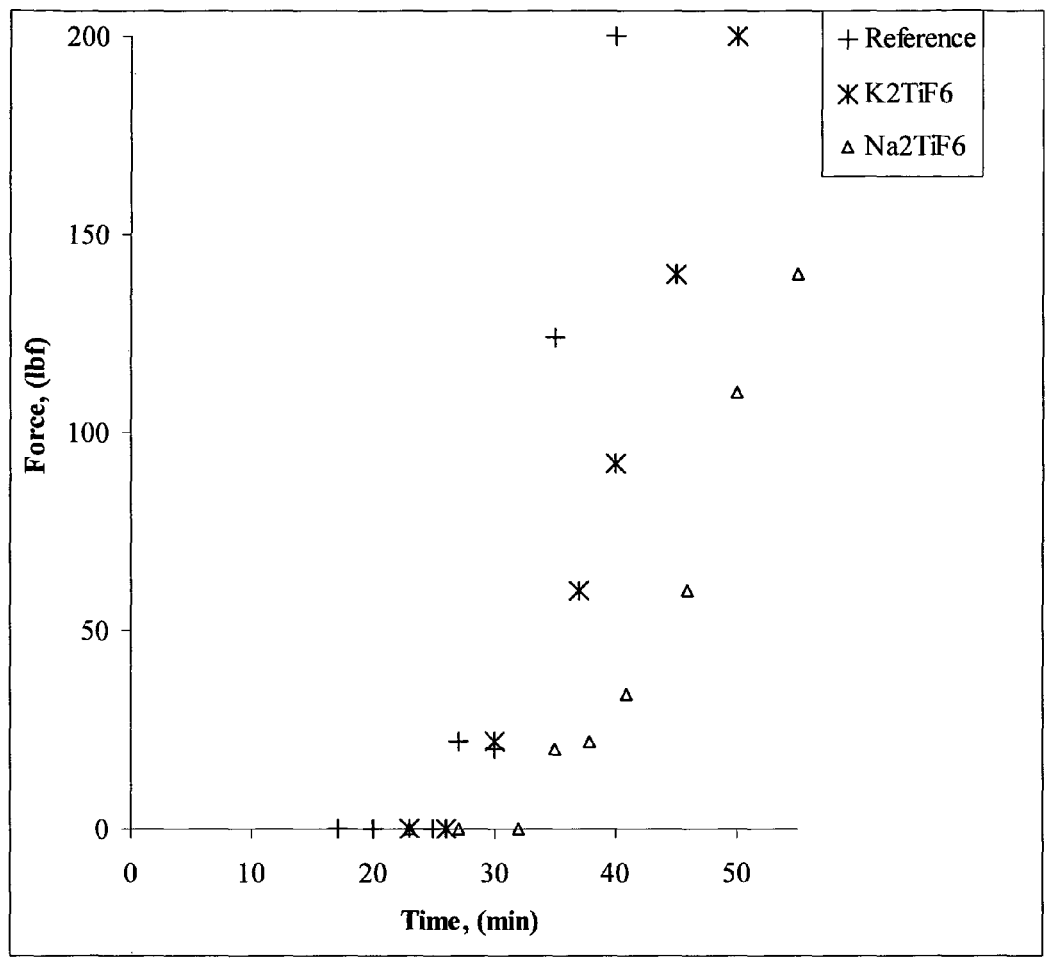
FIG. 6 shows graphs illustrating the effects of various additives on the Vicat penetration force as a function of time after the completion of a 15-minute mixing period.
Figure 6B:
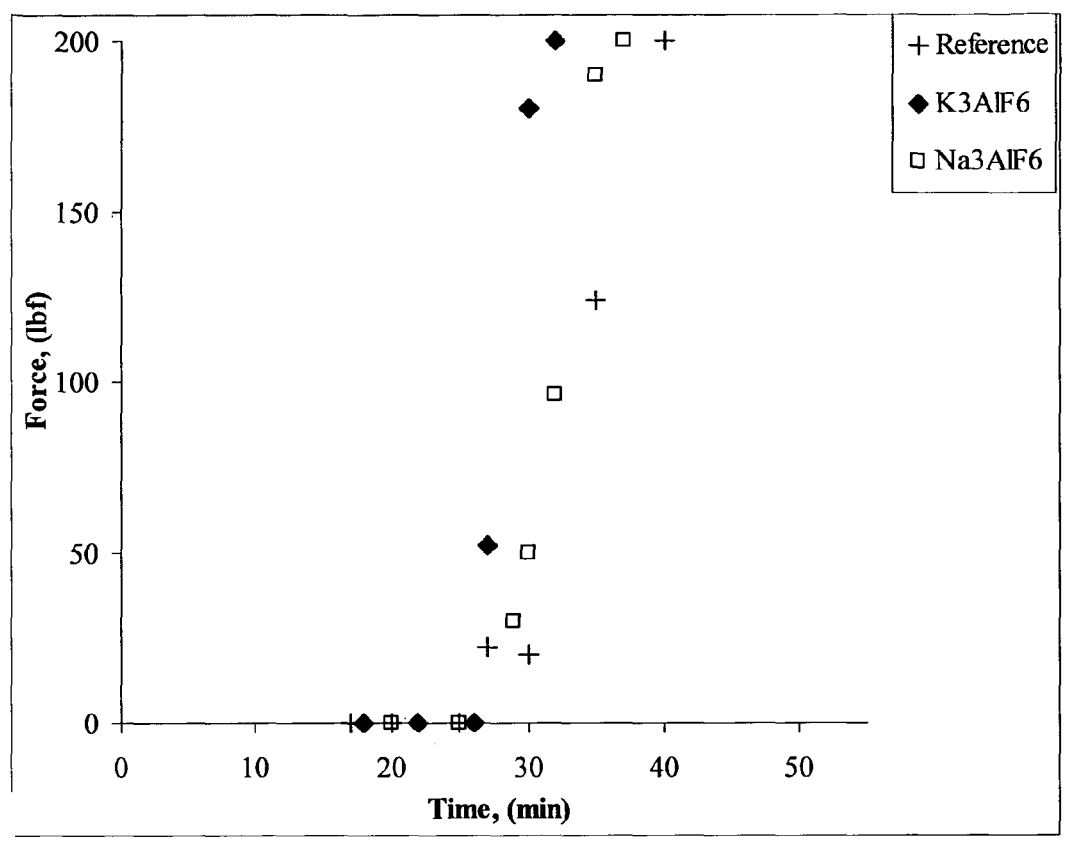
Figure 6C:
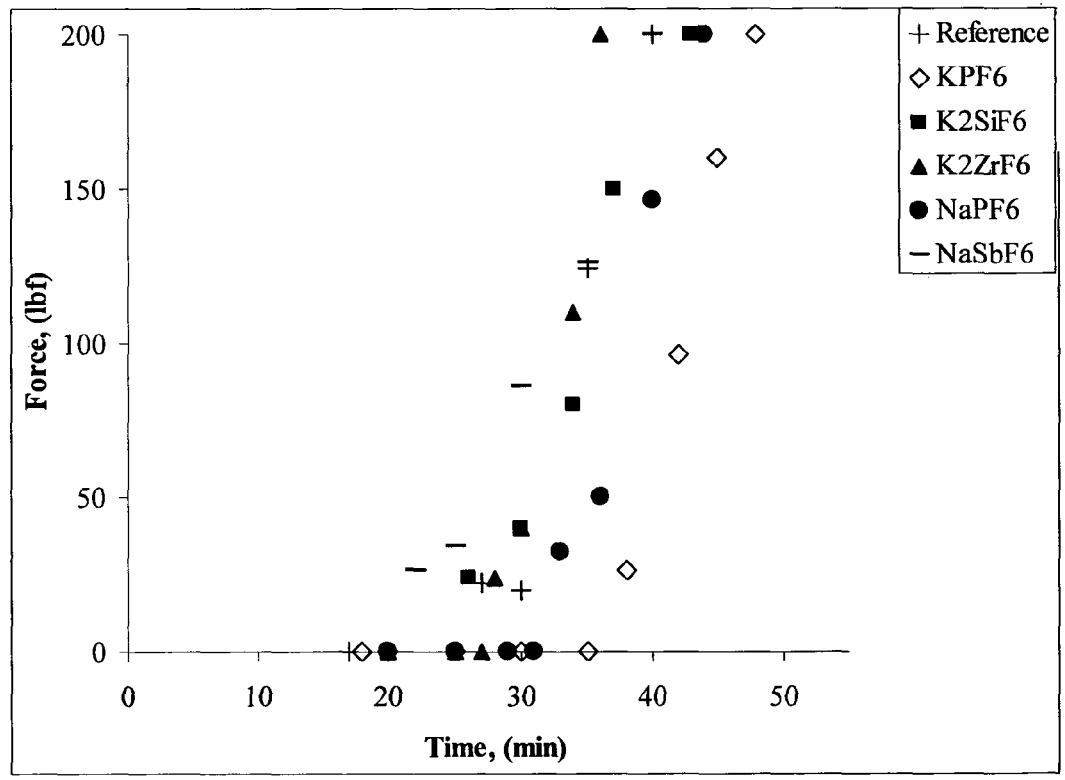

Reference is now made to FIG. 6, showing results of Vicat force penetration tests as a function of time after a 15 minute mixing period. FIG. 6a shows results for cements to which a retardant (1% $K_2TiF_6$ or $Na_2TiF_6$) has been added; FIG. 6b shows results for cements to which an accelerant (1% $K_3AlF_6$ or $Na_3AlF_6$) has been added; and FIG. 6c shows results for cements containing a variety of fluorine-containing additives. These results show the same trends in behavior as were seen for the other properties (FIGS. 1-4) and for the Vicat force penetration tests made during the mixing period.

Figure 7A:
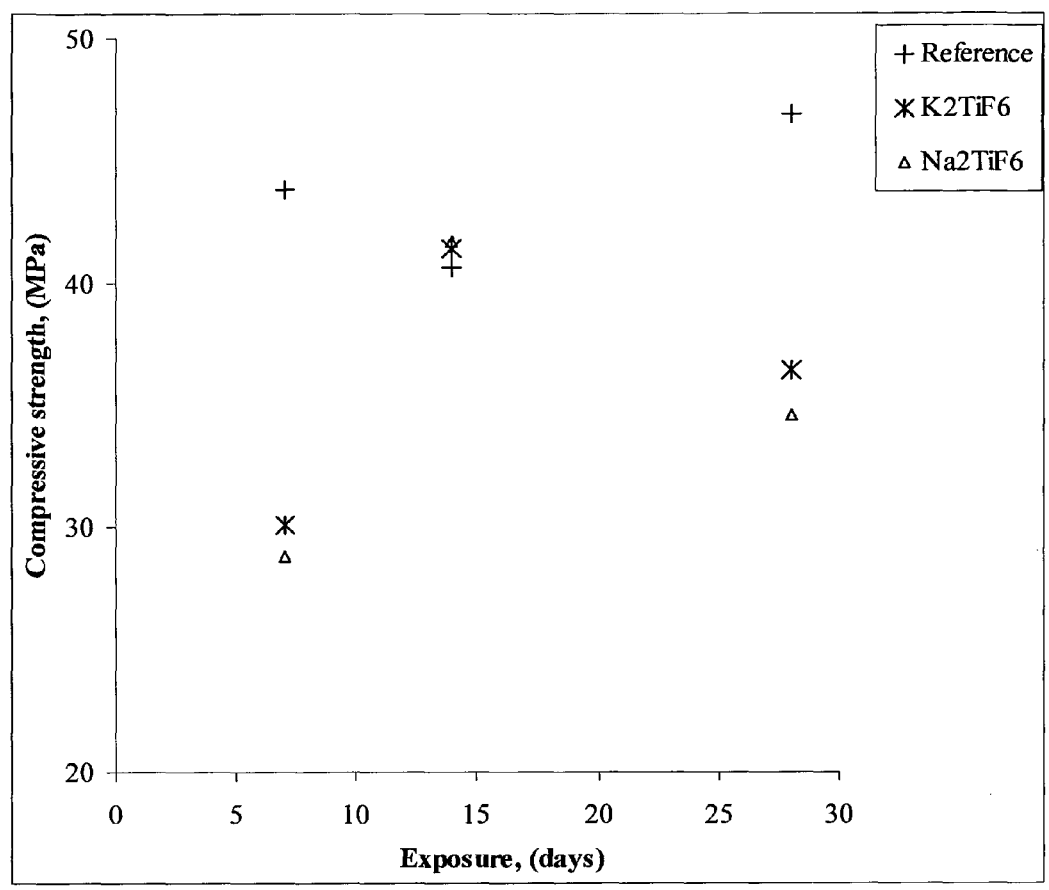
FIG. 7 shows graphs illustrating the effects of various additives on the compressive strength of the set cement (15 minute mixing time) as a function of time after setting.
Figure 7B:
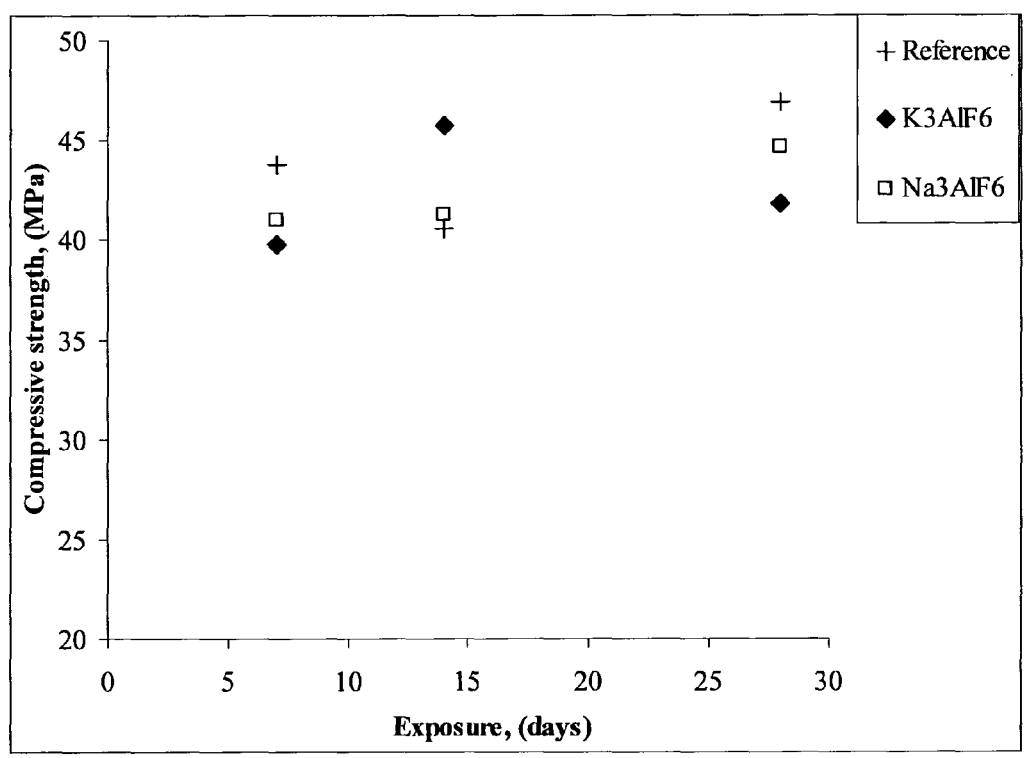
Figure 7C:
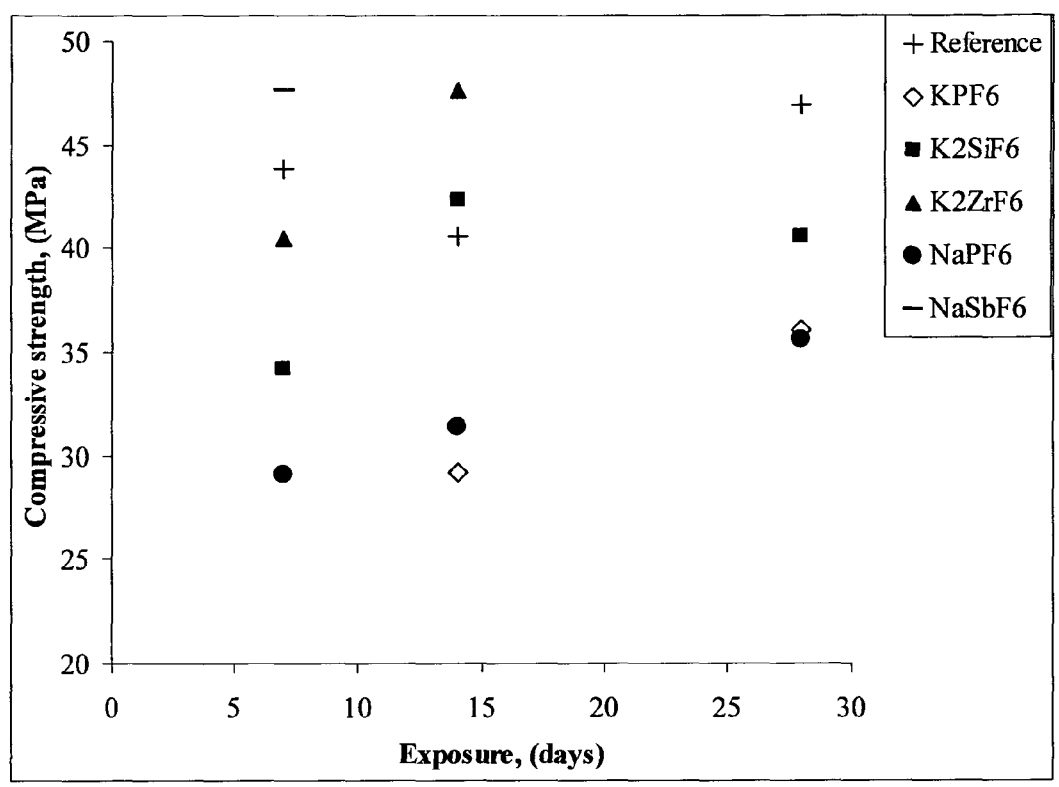

Reference is now made to FIG. 7, showing results of CS measurements of cements (unpolished casts) of varying compositions as a function of time following setting of the cement. In this figure, the properties are being measured on a time scale of tens of days rather than tens of minutes. FIG. 7a shows results for cements to which a retardant (1% $K_2TIF_6$ or $Na_2TiF_6$) has been added; FIG. 7b shows results for cements to which an accelerant (1% $K_3AlF_6$) has been added; and FIG. 7c shows results for cements containing a variety of additional fluorine-containing additives. In all cases, the cement was mixed for 15 min. While there is scatter in the data, it is clear that there are only minor long-term differences between the compressive strength of the cement containing an additive and that of cement to which no additive has been added.

From the results in the figures, we can see that the additives herein disclosed have the desirable properties of being able to alter significantly the hardening time of an MSPC, while, moreover, not affecting to any significant degrees the other physical properties of the hardened cement. The bulk density of each cast was calculated from the measured dimensions and weight, and ranged from 1.88 to 2.04 g/cm$^3$ (~1.95±0.05 g/cm$^3$) and the CS was in the range of 36-51 MPa. Furthermore, results show that all of the $[MF_6]^{n-}$ salts tested fall along a continuum from strong retardant to strong accelerant. We thus conclude that any $[MF_6]^{n-}$ salt (not just the set for which test results are herein reported) will act to alter the hardening rate of an MSPC to which it is added.

Following are a series of detailed descriptions of a set of non-limiting examples of the effects of the additives disclosed on the properties of the cement. The data reported in the tables is identical to that which appears in the graphs displayed as FIGS. 1-7 and described above.

Examples 1-6

$H_2TiF_6$

Example 1 is a control experiment (no additive) that demonstrates the natural properties of the Nova-Set cement to which no retardant or accelerant has been added. Examples 2-6 are non-limiting examples demonstrating the effects of adding varying amounts of $H_2TiF_6$ to the Nova-Set cement. The results are summarized in Table 1.

Example 1a 396 g water (25° C.) was added to 1570 g Nova-Set. The cement was mixed until the viscosity became too high for further mixing. No casting was done.

Example 1b 396 g water (25° C.) was added to 1570 g Nova-Set. The cement was mixed for 15 minutes and cast.

Example 2

3.3 g of a 60% aqueous solution of $H_2TiF_6$ was added to sufficient water (25° C.) to make a total of 396 g. The resulting solution was added to 1570 g Nova-Set (i.e., the $H_2TiF_6$ content of the cement was 0.1% w/w relative to the final cast weight). The cement was mixed for 15 minutes and then cast.

Example 3

8.3 g of a 60% aqueous solution of $H_2TiF_6$ was added to sufficient water (25° C.) to make a total of 396 g. The resulting solution was added to 1570 g Nova-Set (i.e., the $H_2TiF_6$ content of the cement was 0.25% w/w relative to the final cast weight). The cement was mixed until the viscosity became too high for further mixing; no casting was done.

Examples 4-6

9.9 g, 13.2 g, or 33.0 g, respectively, of a 60% aqueous solution of $H_2TiF_6$ was added to sufficient water (25° C.) to make a total of 396 g. The resulting solution was added to 1570 g Nova-Set (i.e., the $H_2TiF_6$ content was 0.3, 0.4, or 1.0%, w/w relative to the final cast weight, respectively). The cement was mixed for 15 minutes and then cast.

TABLE 1

| Ex. | $[H_2TiF_6]$, w/w % | Mixing time (min) | Vicat force (lbf) | Time to Vicat force (min) | Time to increase in mixing power (min) | Time to reach 35° C. (min) | Compressive strength (MPa) 7 days | 28 days |
|---|---|---|---|---|---|---|---|---|
| 1a | 0 | * | — | — | 20 | 12 | — | — |
| 1b | 0 | 15 | 104 | 34 | — | — | 40 | 45 |
| 2 | 0.1 | 15 | 100 | 44 | — | — | 42 | 49 |
| 3 | 0.25 | * | — | — | 61 | 27 | — | — |
| 4 | 0.3 | 15 | 100 | 49 | — | — | 53 | 58 |
| 5 | 0.4 | 15 | 97 | 83 | — | — | 48 | 63 |
| 6 | 1.0 | 15 | 100 | 156 | — | — | 17 | 24 |

* Mixed until the viscosity of the cement became too high for further mixing

Examples 7-13

Examples 7-13 present experimental results that are given as non-limiting examples of the advantages of the present invention. In all of these experiments, the cement was mixed until the viscosity became too high for further mixing. From the results of these experiments, it can be seen that the fluoride-containing additives have large effects on such parameters as setting time, while not having any noticeable detrimental effects on the physical properties of the cement, such as its compressive strength.

Example 7

This Example is a control experiment, using a reference cement not containing additive. 1884 g Nova-Set was added to 475.2 g water (25° C.) during the course of 1.5 minutes. The cement was mixed until the viscosity became too high for further mixing.

Example 8-13

1884 g Nova-Set and 1% (w/w relative to the final set weight) of an additive were introduced into 475.2 g water (25° C.) during the course of 1.5 minutes. The cement was mixed until the viscosity became too high for further mixing.

Table 2 summarizes the results for examples 7-13. For these examples, the best measure of the additive's retardant or accelerant effect is the time derivative of the temperature. Therefore, in addition to the maximum temperature ($T_{max}$) and the time $t_{max}$ to reach that temperature, the ratio $\Delta T/t_{max}$ (where $\Delta T$=the overall temperature change, i.e. $T_{max}$−25) is given as well.

TABLE 2

| Ex. | Additive | $T_{max}$, ° C. | $t_{max}$ to $T_{max}$, min | $\Delta T/t_{max}$, ° C./min | Time to maximum mixing power, min |
|---|---|---|---|---|---|
| 7 | none | 42.0 | 24 | 0.71 | 23 |
| 8a | $Na_2TiF_6$ | 44.0 | 43 | 0.44 | 44 |
| 8b | $K_2TiF_6$ | 43.8 | 45 | 0.42 | 31 |
| 9 | $K_2ZrF_6$ | 40.0 | 23 | 0.65 | 24 |
| 10a | $Na_3AlF_6$ | 40.0 | 22 | 0.68 | 23 |
| 10b | $K_3AlF_6$ | 41.5 | 20 | 0.83 | 21 |
| 11a | $NaPF_6$ | 41.0 | 20 | 0.80 | 20 |
| 11b | $KPF_6$ | 42.2 | 27 | 0.64 | 27 |
| 12 | $K_2SiF_6$ | 41.7 | 22 | 0.76 | 23 |
| 13 | $NaSbF_6$ | 43.0 | 36 | 0.50 | 26 |

Examples 14-20

In order further to demonstrate the advantages of the present invention and in order to provide further data for determining optimum experimental conditions, a further series of experiments was performed. The results shown graphically in the figures are drawn from this series of experiments. Example 14 is a control experiment (no additive) to illustrate the native properties of the cement. For each of examples 14-20, the cement was prepared by adding 475.2 g of water at 25° C. to 1884 g of Nova-Set (Example 14) or to a mixture of 1884 g of Nova-Set and 23.6 g of additive (i.e., 1% w/w relative to the final cast weight, Examples 15-20). For each composition, the powder mixture and the water were mixed for 15 minutes and cast. The measurements on the casts are summarized in Table 3.

The ratios $\Delta T/t_{max}$ and $\Delta F/t_v$, where $\Delta T$ and $t_{max}$ are defined as above, $\Delta F$=100 lbf is the change in Vicat penetration force, and $t_v$ is the time needed to reach a Vicat penetration force of 100 lbf, are given as well. These ratios provide an useful measure of the extent of the retardant or accelerant effect of a particular additive.

TABLE 3

| Ex. | Additive | $T_{max}$, ° C. | $t_{max}$ to $T_{max}$, min | $t_v$, min | $100/t_v$ (lbf/min) | Compressive Strength (MPa) 7 days | 28 days |
|---|---|---|---|---|---|---|---|
| 14 | none | 59 | 35 | 31 | 3.2 | 43.8 | 46.9 |
| 15a | $Na_2TiF_6$ | 51 | 55 | 48 | 2.1 | 28.8 | 34.6 |

TABLE 3-continued

| Ex. | Additive | $T_{max}$, °C | $t_{max}$ to $T_{max}$, min | $t_v$, min | $100/t_v$ (lbf/min) | Compressive Strength (MPa) 7 days | Compressive Strength (MPa) 28 days |
|---|---|---|---|---|---|---|---|
| 15b | $K_2TiF_6$ | 52 | 50 | 41 | 2.4 | 30.1 | 36.4 |
| 16 | $K_2ZrF_6$ | 61 | 36 | 33 | 3.0 | 40.5 | 51.4 |
| 17a | $Na_3AlF_6$ | 61 | 35 | 32 | 3.1 | 41.0 | 44.7 |
| 17b | $K_3AlF_6$ | 61 | 32 | 28 | 3.6 | 39.8 | 41.8 |
| 18a | $NaPF_6$ | 59 | 40 | 38 | 2.6 | 29.1 | 35.6 |
| 18b | $KPF_6$ | 59 | 45 | 42 | 2.4 | — | 36.1 |
| 19 | $K_2SiF_6$ | 61 | 37 | 35 | 2.9 | 34.2 | 40.6 |
| 20 | $NaSbF_6$ | 52 | 40 | 32 | 3.1 | 47.6 | 50.4 |

The results summarized in the tables and shown graphically in the figures clearly show that $[MF_6]^{n-}$ additives have significant effects on the hardening time of MSPC without having detrimental effects on the physical properties of the cement. Based on these results, we conclude that these effects are a general property of $[MF_6]^{n-}$ additives. In particular, similar behavior is expected from other alkali and alkaline earth salts of $TiF_6^{2-}$ and $ZrF_6^{2-}$, and in fact from any salt of an $[MF_6]^{n-}$ anion, where M is any element that can form with fluorine such an anion.

The invention claimed is:

1. A magnesium silico-phosphate cement (MSPC) comprising:
   a. a dry cement mix to which a fluorine-containing additive has been added, comprising:
      i. MgO;
      ii. a phosphate salt or acid selected from the group consisting of (a) a phosphate salt or acid of the general formula $M_xH_yPO_4$ ($1 \leq x \leq 3$, $y=3-x$), where M is selected from the group consisting of H, Li, Na, K, Rb, Cs, $NH_4$, and any combination of the above; (b) any other phosphate salt or acid that will provide a binder product characterized by the empirical chemical formula $MMgPO_4 \cdot 6H_2O$, and (c) any combination of the above;
      iii. an aggregate phase selected from the group containing (a) $CaSiO_3$, (b) $SiO_2$, (c) fly ash, (d) sea sand, and (e) any combination thereof; and,
      iv. a fluorine-containing additive; and,
   b. sufficient water to effect hydraulic hardening of said cement;
wherein said fluorine-containing additive is selected from the group consisting of (a) alkali metal salts of $[M'F_6]^{n-}$, (b) alkaline earth metal salts of $[M'F_6]^{n-}$, and (c) $H_nM'F_6$, wherein n represents a positive integer and M' is selected from the group consisting of (a) Ti (n=2), (b) P (n=1), (c) Zr (n=2), (d) Sb (n=1), and (e) Al (n=3).

2. The MSPC of claim 1, wherein the crystal structure of said binder product is isomorphic with $NH_4MgPO_4 \cdot 6H_2O$.

3. The MSPC of claim 1, wherein M' is selected from the group consisting of (a) Ti (n=2), (b) P (n=1), (c) Zr (n=2), and (d) Sb (n=1), and further wherein said additive acts as a retarder.

4. The MSPC of claim 3, wherein said retarder is selected from the group consisting of (a) $Na_2TiF_6$; (b) $K_2TiF_6$; and (c) any combination of the above.

5. The MSPC of claim 3, wherein said retarder is present in an amount of between about 0.05% and about 5% by weight based upon the weight of dry cement.

6. The MSPC of claim 1, wherein M' is selected from the group consisting of (a) Al (n=3) and (b) P (n=1), and further wherein said additive acts as an accelerant.

7. The MSPC of claim 6, wherein said accelerant is $K_3AlF_6$.

8. The MSPC of claim 6, wherein said accelerant is present in an amount of between about 0.05% and about 5% by weight based upon the weight of dry cement.

9. A magnesium silico-phosphate cement (MSPC) comprising:
   a. a dry cement mix comprising
      i. MgO;
      ii. a phosphate salt or acid selected from the group consisting of (a) a phosphate salt or acid of the general formula $M_xH_yPO_4$ ($1 \leq x \leq 3$, $y=3-x$) where M is selected from the group consisting of H, Li, Na, K, Rb, Cs, $NH_4$, and any combination of the above; (b) any other phosphate salt or acid that will provide a binder product characterized by the empirical chemical formula $MMgPO_4 \cdot 6H_2O$; and (c) any combination of the above;
      iii. an aggregate phase selected from the group containing (a) $CaSiO_3$, (b) $SiO_2$, (c) fly ash, (d) sea sand, and (e) any combination thereof; and,
   b. sufficient water to effect hydraulic hardening of said cement, said water containing a fluorine-containing additive, in a form selected from the group consisting of (i) suspension, (ii) solution, (iii) any combination thereof;
wherein said fluorine-containing additive is selected from the group consisting of (a) alkali metal salts of $[M'F_6]^{n-}$, (b) alkaline earth metal salts of $[M'F_6]^{n-}$, and (c) $H_nM'F_6$, wherein n represents a positive integer and M' is selected from the group consisting of (a) Ti (n=2), (b) P (n=1), (c) Zr (n=2), (d) Sb (n=1), and (e) Al (n=3).

10. The MSPC of claim 9, wherein the crystal structure of said binder product is isomorphic with $NH_4MgPO_4 \cdot 6H_2O$.

11. The MSPC of claim 9, wherein M' is selected from the group consisting of (a) Ti (n=2), (b) P (n=1), (c) Zr (n=2), and (d) Sb (n=1), and further wherein said additive acts as a retarder.

12. The MSPC of claim 11, wherein said retarder is selected from the group consisting of (a) $Na_2TiF_6$; (b) $K_2TiF_6$; and (c) any combination of the above.

13. The MSPC of claim 11, wherein said retarder is present in an amount of between about 0.05% and about 5% by weight based upon the weight of dry cement.

14. The MSPC of claim 9, wherein M' is selected from the group consisting of (a) Al (n=3) and (b) P (n=1), and further wherein said additive acts as an accelerant.

15. The MSPC of claim 14, wherein said accelerant is $K_3AlF_6$.

16. The MSPC of claim 14, wherein said accelerant is present in an amount of between about 0.05% and about 5% by weight based upon the weight of dry cement.

17. A method for altering the rate of hardening of a magnesium-silicophosphate cement (MSPC), comprising the steps of:
   a. obtaining a magnesium silico-phosphate cement mix, said cement mix comprising
      i. MgO;
      ii. a phosphate salt selected from the group consisting of (a) a phosphate salt or acid of the general formula $M_xH_yPO_4$ ($1 \leq x \leq 3$, $y=3-x$) where M is selected from the group consisting of H, Li, Na, K, Rb, Cs, $NH_4$, and any combination of the above; (b) any other phosphate salt or acid that will provide a binder product characterized by the empirical chemical formula MMgPO$_4$·6H$_2$O; and (c) any combination of the above; and iii. an aggregate phase selected from the group containing (a) CaSiO$_3$, (b) SiO$_2$, (c) fly ash, (d) sea sand, and (e) any combination thereof;

b. admixing into said cement mix a fluorine-containing additive that alters the rate of hardening of an MSPC; and, c. adding sufficient water to said mixture to effect hydraulic setting of said cement;

wherein said fluorine-containing additive is selected from the group consisting of (a) alkali metal salts of [M'F$_6$]$^{n-}$, (b) alkaline earth metal salts of [M'F$_6$]$^{n-}$, and (c) H$_n$M'F$_6$, wherein n represents a positive integer and M' is selected from the group consisting of (a) Ti (n=2), (b) P (n=1), (c) Zr (n=2), (d) Sb (n=1), and (e) Al (n=3).

18. The method of claim 17, wherein said binder product is isomorphic with NH$_4$MgPO$_4$·6H$_2$O.

19. The method of claim 17, wherein M' is selected from the group consisting of (a) Ti (n=2), (b) Zr (n=2), (c) P (n=1), and (d) Sb (n=1), and further wherein said additive acts as a retarder.

20. The method of claim 19, wherein said retarder is selected from the group consisting of (a) Na$_2$TiF$_6$; (b) K$_2$TiF$_6$; and (c) any combination of the above.

21. The method of claim 19, wherein said retarder is present in an amount of between about 0.05% and about 5% by weight based upon the weight of dry cement.

22. The method of claim 17, wherein M' is selected from the group consisting of (a) Al (n=3) and (b) P (n=1), and further wherein said additive acts as an accelerant.

23. The method of claim 22, wherein said accelerant is K$_3$AlF$_6$.

24. The method of 22, wherein said accelerant is present in an amount of between about 0.05% and about 5% by weight based upon the weight of dry cement.

25. A method for altering the rate of hardening of an MSPC, comprising the steps of:

a. obtaining a magnesium silico-phosphate cement mix comprising
   i. MgO;
   ii. a phosphate salt or acid selected from the group consisting of (a) a phosphate salt or acid of the general formula M$_x$H$_y$PO$_4$ (1≦x≦3, y=3−x) where M is selected from the group consisting of H, Li, Na, K, Rb, Cs, NH$_4$, and any combination of the above; (b) any other phosphate salt or acid that will provide a binder product characterized by the empirical chemical formula MMgPO$_4$·6H$_2$O; and (c) any combination of the above; and
   iii. an aggregate phase selected from the group containing CaSiO$_3$, SiO$_2$, fly ash, sea sand, and any combination thereof;

b. adding a volume of water sufficient to effect hydraulic setting of said cement;

c. adding to said volume of water a fluorine-containing additive that alters the rate of hardening of an MSPC, whereby said step of adding produces a combination of said fluorine-containing additive in said volume of water selected from the group consisting of (a) suspension, (b) solution, and (c) any combination of the above; and, d. admixing said cement mix and said suspension and/or solution;

wherein said fluorine-containing additive is selected from the group consisting of (a) alkali metal salts of [M'F$_6$]$^{n-}$, (b) alkaline earth metal salts of [M'F$_6$]$^{n-}$, and (c) H$_n$M'F$_6$, wherein n represents a positive integer and M' is selected from the group consisting of (a) Ti (n=2), (b) P (n=1), (c) Zr (n=2), (d) Sb (n=1), and (e) Al (n=3).

26. The method of claim 25, wherein said binder product is isomorphic with NH$_4$MgPO$_4$·6H$_2$O.

27. The method of claim 25, wherein M' is selected from the group consisting of (a) Ti (n=2), (b) Zr (n=2), (c) P (n=1), and (d) Sb (n=1), and further wherein said additive acts as a retarder.

28. The method of claim 27, wherein said retarder is selected from the group consisting of (a) Na$_2$TiF$_6$; (b) K$_2$TiF$_6$; and (c) any combination of the above.

29. The method of claim 27, wherein said retarder is present in an amount of between about 0.05% and about 5% by weight based upon the weight of dry cement.

30. The method of claim 25, wherein M' is selected from the group consisting of (a) Al (n=3) and (b) P (n=1), and further wherein said additive acts as an accelerant.

31. The method of claim 30, wherein said accelerant is K$_3$AlF$_6$.

32. The method of claim 30, wherein said accelerant is present in an amount of between about 0.05% and about 5% by weight based upon the weight of dry cement.

* * * * *